United States Patent
Morishita

(10) Patent No.: US 12,340,821 B2
(45) Date of Patent: *Jun. 24, 2025

(54) NOTIFICATION SYSTEM, NOTIFICATION METHOD, AND NON-TRANSITORY COMPUTER READABLE MEDIUM STORING PROGRAM

(71) Applicant: NEC Corporation, Tokyo (JP)

(72) Inventor: Shota Morishita, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/416,055

(22) Filed: Jan. 18, 2024

(65) Prior Publication Data

US 2024/0153528 A1 May 9, 2024

Related U.S. Application Data

(63) Continuation of application No. 17/982,578, filed on Nov. 8, 2022, now Pat. No. 12,057,137, which is a
(Continued)

(30) Foreign Application Priority Data

Oct. 20, 2017 (JP) .................................. 2017-203406

(51) Int. Cl.
   *G08B 21/02* (2006.01)
   *G10L 25/66* (2013.01)
   *H04M 3/02* (2006.01)

(52) U.S. Cl.
   CPC .............. *G10L 25/66* (2013.01); *G08B 21/02* (2013.01); *H04M 3/02* (2013.01)

(58) Field of Classification Search
   CPC ..... G10L 25/66; G08B 21/02; G08B 13/1672; H04M 3/02; H04M 11/08; H04M 19/044
   (Continued)

(56) References Cited

U.S. PATENT DOCUMENTS

| | | | |
|---|---|---|---|
| 5,706,399 A | 1/1998 | Bareis | .................... B60R 25/04 |
| | | | 704/274 |
| 6,970,183 B1 | 11/2005 | Monroe | |
| | (Continued) | | |

FOREIGN PATENT DOCUMENTS

| | | |
|---|---|---|
| JP | 2001-357476 A | 12/2001 |
| JP | 2002-251681 A | 9/2002 |
| | (Continued) | |

OTHER PUBLICATIONS

US Notice of Allowance for U.S. Appl. No. 17/982,578, mailed on Apr. 8, 2024.
(Continued)

*Primary Examiner* — Tai T Nguyen
(74) *Attorney, Agent, or Firm* — Sughrue Mion, PLLC

(57) ABSTRACT

A notification system includes: detection means (110) for detecting an acoustic event from voice data transmitted from a communication terminal held by a target person; and notification means (120) for sending a predetermined notification when the detection means (110) has detected the acoustic event. Accordingly, it is possible to determine the state of a target person regardless of the state of this person. Further, when the difference between an acoustic pattern of the voice data transmitted from the communication terminal and acoustic patterns registered in advance is outside a predetermined range, a management server (101) does not send a notification, whereby it is possible to prevent communication traffic from being increased based on unnecessary notifications.

10 Claims, 19 Drawing Sheets

Related U.S. Application Data continuation of application No. 16/756,536, filed as application No. PCT/JP2018/030510 on Aug. 17, 2018, now Pat. No. 11,527,258.

(58) Field of Classification Search
USPC .......................................................... 704/231
See application file for complete search history.

(56) References Cited

U.S. PATENT DOCUMENTS

| | | | |
|---|---|---|---|
| 8,054,950 B1* | 11/2011 | Hung .................... | G16H 40/67 |
| | | | 709/227 |
| 9,530,407 B2 | 12/2016 | Katuri .................... | H04R 3/005 |
| 9,730,181 B1 | 8/2017 | Matsumoto | |
| 10,580,288 B2 | 3/2020 | Layton ............. | G11B 20/10527 |
| 2005/0086071 A1* | 4/2005 | Fox ........................ | G16H 40/67 |
| | | | 705/2 |
| 2005/0151640 A1 | 7/2005 | Hastings | |
| 2006/0017579 A1 | 1/2006 | Albert et al. | |
| 2007/0299473 A1* | 12/2007 | Matos .................. | A61N 1/3904 |
| | | | 607/9 |
| 2008/0046037 A1 | 2/2008 | Haubrich et al. | |
| 2013/0183924 A1 | 7/2013 | Saigh et al. | |
| 2014/0368643 A1 | 12/2014 | Siegel et al. | |
| 2015/0066557 A1* | 3/2015 | Lichti .............. | G06Q 10/06311 |
| | | | 705/34 |
| 2015/0223731 A1 | 8/2015 | Sahin ...................... | A61B 5/16 |
| | | | 600/595 |
| 2016/0283681 A1 | 9/2016 | Falck ...................... | G16Z 99/00 |
| 2017/0051144 A1 | 2/2017 | Leibler et al. | |
| 2017/0069190 A1 | 3/2017 | Hansen ................ | G06V 40/172 |
| 2018/0350455 A1* | 12/2018 | Rosen .................... | G16H 80/00 |
| 2021/0037134 A1 | 2/2021 | Hatanaka et al. | |

FOREIGN PATENT DOCUMENTS

| | | |
|---|---|---|
| JP | 2005-032139 A | 2/2005 |
| JP | 2006-230446 A | 9/2006 |
| JP | 2012-095091 A | 5/2012 |
| KR | 2015-0041281 A | 4/2015 |
| WO | 2007/049596 A1 | 5/2007 |

OTHER PUBLICATIONS

US Office Action for U.S. Appl. No. 18/415,834 mailed on Sep. 20, 2024.
International Search Report for PCT Application No. PCT/JP2018/030510 mailed on Oct. 30, 2018.
Extended European Search Report for EP Application No. EP18869325.3 dated on Sep. 30, 2020.
Japanese Office Action for JP Application No. 2019-549129 mailed on Sep. 7, 2021 with English Translation.
US Notice of Allowance for U.S. Appl. No. 18/415,834, mailed on Jan. 23, 2025.
US Office Communication for U.S. Appl. No. 18/414,538, mailed on Mar. 19, 2025.

* cited by examiner

| TARGET PERSON | | DESTINATION OF NOTIFICATION | |
|---|---|---|---|
| TELEPHONE NUMBER | E-MAIL ADDRESS | TELEPHONE NUMBER | E-MAIL ADDRESS |
| 090-XXXX-XXXX | XX@XX.XX.XX | 090-YYYY-YYYY | YY@YY.YY.YY |
| ... | ... | ... | ... |

| TELEPHONE NUMBER | E-MAIL ADDRESS | CONDITIONS ||
|---|---|---|---|
| | | OPERATION ITEM | OPERATION RANGE |
| ... | ... | TIME TO ANSWER TELEPHONE | WITHIN ○ SECONDS |
| | | TIME TO DISCONNECT TELEPHONE | ○-○ MINUTES |
| | | ... | ... |
| ... | ... | ... | ... |

Fig. 15

| CONDITIONS ||
|---|---|
| DISPLAY STATE | CONTENT OF OPERATION |
| DISPLAY A-D BUTTONS | TOUCH ANY ONE OF A-D BUTTONS |
| CHARACTER INPUT SCREEN | TOUCH FOR INPUTTING CHARACTERS THAT CAN BE CONVERTED INTO OTHER CHARACTERS |
| ⋮ | ⋮ |

Fig. 16

NOTIFICATION SYSTEM, NOTIFICATION METHOD, AND NON-TRANSITORY COMPUTER READABLE MEDIUM STORING PROGRAM

The present application is a Continuation application of Ser. No. 17/982,578 filed on Nov. 8, 2022, which issued as U.S. Pat. No. 12,057,137, which is a Continuation application of Ser. No. 16/756,536 filed on Apr. 16, 2020, which issued as U.S. Pat. No. 11,527,258, which is a National Stage Entry of PCT/JP2018/030510 filed on Aug. 17, 2018, claiming priority based on Japanese Patent Application No. 2017-203406 filed on Oct. 20, 2017, the disclosure of which is incorporated herein in its entirety by reference.

TECHNICAL FIELD

The present disclosure relates to a notification system, a notification method, and a program.

BACKGROUND ART

In recent years, due to the aging of society, the number of elderly people living alone has been increasing. Various services that watch over these people living alone have been proposed. For example, an apparatus that compares a voice of a target person who is a target to be watched over in response to an inquiry to this target person with a voice of the target person in a healthy state and estimates the health condition based on the results of the comparison has been proposed (see, for example, Patent Literature 1).

CITATION LIST

Patent Literature

[Patent Literature 1] Japanese Unexamined Patent Application Publication No. 2006-230446

SUMMARY OF INVENTION

Technical Problem

The aforementioned technique is based on the assumption that the target person can make a conversation. However, when, for example, the condition of the target person is so bad that this person cannot make a conversation, it is difficult to estimate his/her health condition. Thus there is a problem that it is difficult to constantly determine the condition of the target person.

An object of the present disclosure is to provide a notification system, a notification method, and a program capable of solving the aforementioned problem.

Solution to Problem

A notification system according to the present disclosure includes:
  detection means for detecting an acoustic event from voice data transmitted from a communication terminal held by a target person; and
  notification means for sending a predetermined notification when the detection means has detected the acoustic event.

The notification system further includes:
  determination means for determining whether the content of an operation performed on a communication terminal held by a target person satisfies predetermined conditions; and
  notification means for sending a predetermined notification when the determination means determines that the content of the operation does not satisfy the predetermined conditions.

Further, a notification method according to the present disclosure performs the following processing:
  detecting an acoustic event from voice data transmitted from a communication terminal held by a target person; and
  sending a predetermined notification when the acoustic event has been detected.

Further, a notification method performs the following processing:
  determining whether the content of an operation performed on a communication terminal held by a target person satisfies predetermined conditions; and
  sending a predetermined notification when it is determined that the content of the operation does not satisfy the predetermined conditions.

Further, a program according to the present disclosure is a program for causing a computer to execute the following procedures:
  detecting an acoustic event from voice data transmitted from a communication terminal held by a target person; and
  sending a predetermined notification when the acoustic event has been detected.

Further, a program causes a computer to execute the following procedures:
  determining whether the content of an operation performed on a communication terminal held by a target person satisfies predetermined conditions; and
  sending a predetermined notification when it is determined that the content of the operation does not satisfy the predetermined conditions.

Advantageous Effects of Invention

As described above, according to the present disclosure, it is possible to determine the state of the target person regardless of his/her state.

BRIEF DESCRIPTION OF DRAWINGS

FIG. 15 is a diagram showing one example of conditions stored in the database shown in FIG. 14;

FIG. 16 is a diagram showing another example of the conditions stored in the database shown in FIG. 14;

DESCRIPTION OF EMBODIMENTS

Hereinafter, with reference to the drawings, example embodiments of the present disclosure will be explained.

First Example Embodiment

Figure 1:
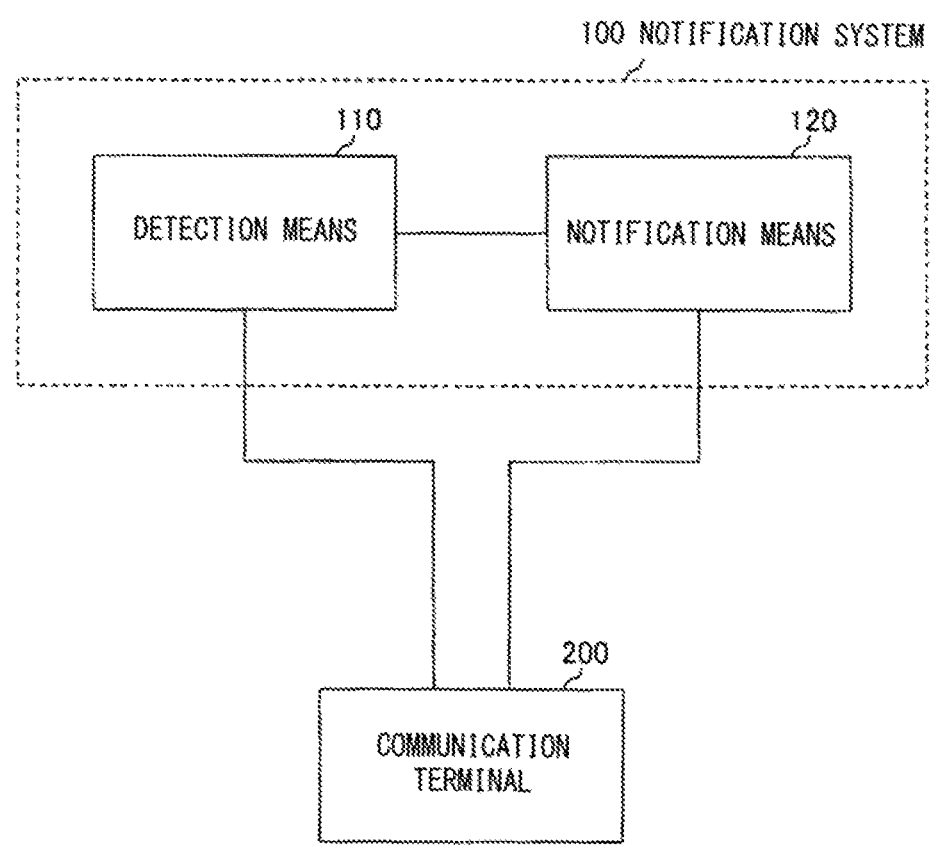
FIG. 1 is a diagram showing a first example embodiment of a notification system according to the present disclosure.

FIG. 1 is a diagram showing a first example embodiment of a notification system according to the present disclosure. As shown in FIG. 1, a notification system 100 according to this example embodiment includes detection means 110 and notification means 120.

The detection means 110 detects an acoustic event from the voice data transmitted from a communication terminal 200 held by a target person.

The notification means 120 sends a predetermined notification when the detection means 110 has detected the acoustic event.

Figure 2:
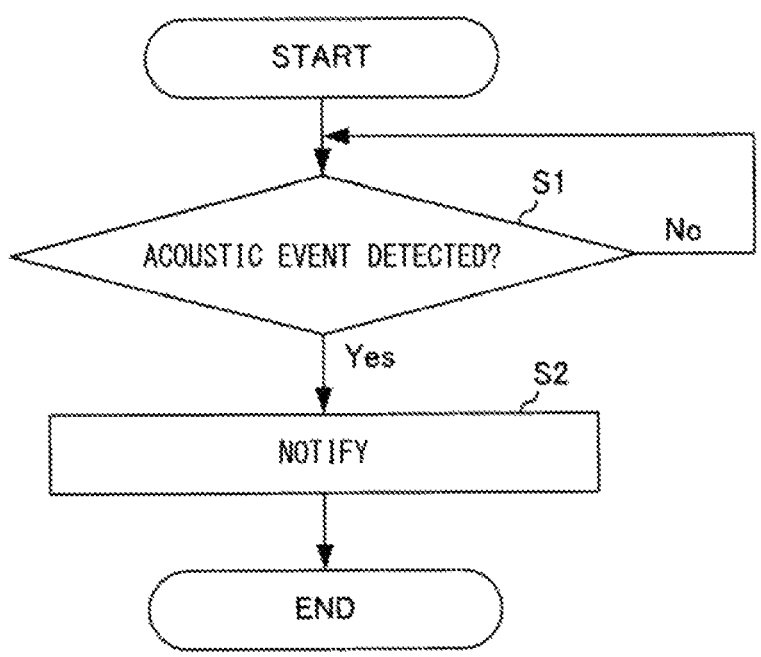
FIG. 2 is a flowchart for explaining one example of a notification method in the notification system shown in FIG. 1.

In the following descriptions, a notification method in the notification system 100 shown in FIG. 1 will be explained. FIG. 2 is a flowchart for explaining one example of the notification method in the notification system 100 shown in FIG. 1.

First, the detection means 110 detects an acoustic event from the voice data transmitted from the communication terminal 200 held by the target person (Step S1). When the detection means 110 has detected the acoustic event, the notification means 120 sends a predetermined notification (Step S2).

As described above, in the notification system 100 according to this example embodiment, when the detection means 110 has detected an acoustic event, the notification means 120 sends a predetermined notification. It is therefore possible to obtain accurate information regarding the state of the target person who holds the communication terminal 200.

Second Example Embodiment

Figure 3:
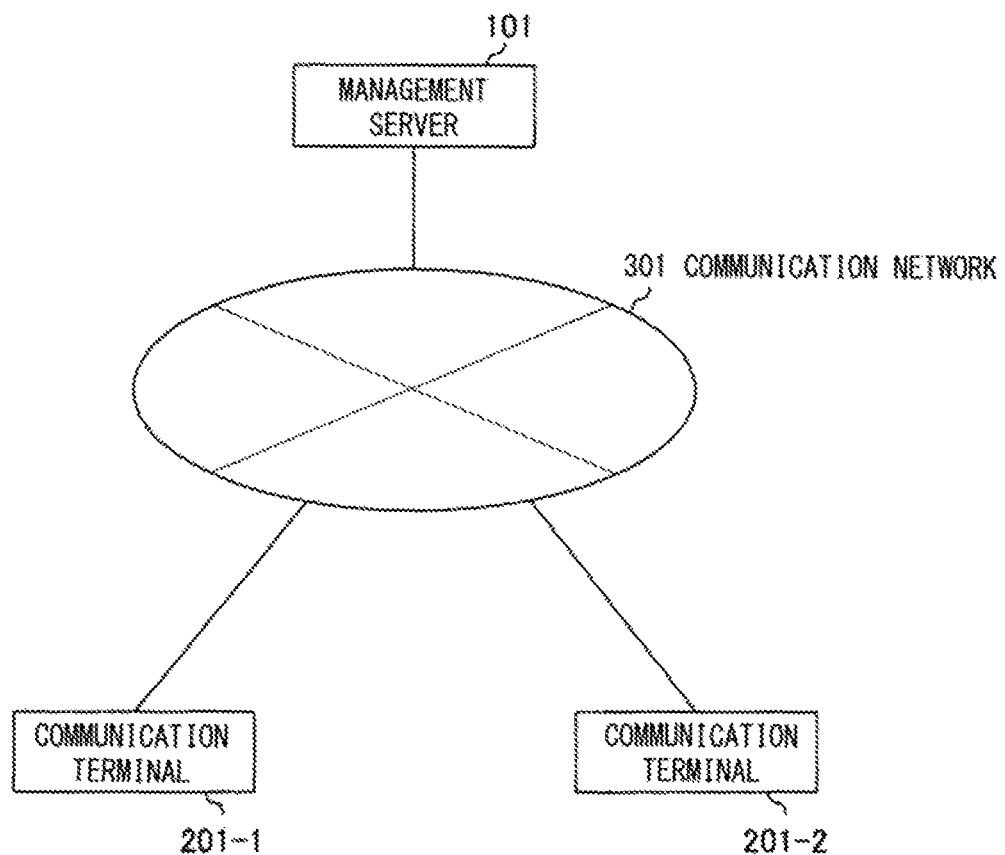
FIG. 3 is a diagram showing a second example embodiment of the notification system according to the present disclosure.

FIG. 3 is a diagram showing a second example embodiment of a notification system according to the present disclosure. The notification system according to this example embodiment is implemented by an apparatus of a management server 101. As shown in FIG. 3, the notification system according to this example embodiment includes a management server 101, which is the notification system, and communication terminals 201-1 and 201-2. The management server 101 and the communication terminals 201-1 and 201-2 are connected to each other via a communication network 301.

The communication terminal 201-1 is a communication apparatus such as a mobile terminal held by the target person. The communication terminal 201-2 is a communication apparatus such as a mobile terminal held by one of family members or relatives of the target person. The telephone numbers and the e-mail addresses of the communication terminals 201-1 and 201-2 are registered in the management server 101 in such a way that they are associated with each other.

Figure 4:
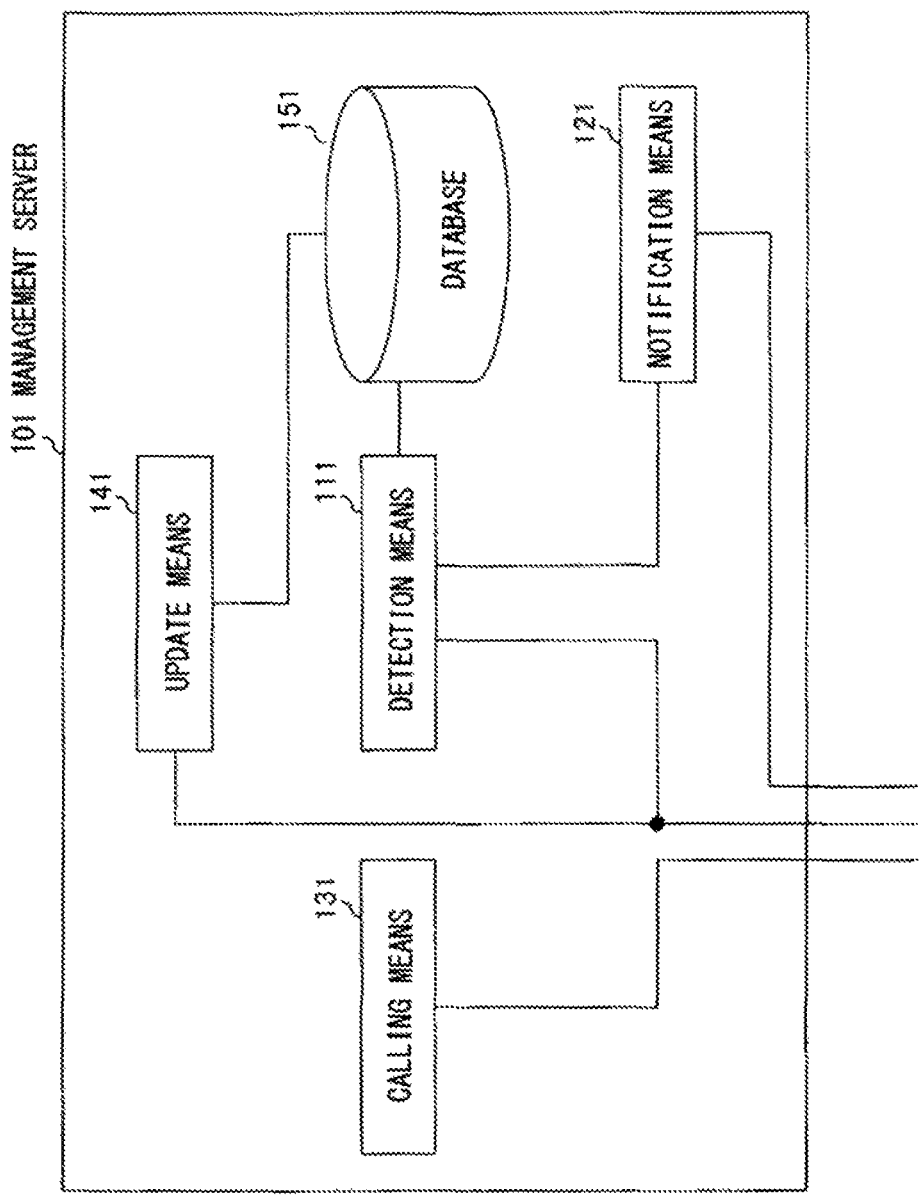
FIG. 4 is a diagram showing one example of an internal configuration of a management server shown in FIG. 3.

FIG. 4 is a diagram showing one example of the internal configuration of the management server 101 shown in FIG. 3. As shown in FIG. 4, the management server 101 shown in FIG. 3 includes detection means 111, notification means 121, calling means 131, update means 141, and a database 151. FIG. 4 shows one example of main components that relate to this example embodiment among the components that the management server 101 shown in FIG. 3 includes.

The calling means 131 makes a call to the communication terminal 201-1 held by the target person. When the communication terminal 201-1 responds after the calling means 131 makes a call to the communication terminal 201-1, the calling means 131 transmits, to the communication terminal 201-1, a message or guidance for encouraging the target person to speak. This message or the guidance may be the one registered in the database 151 in advance. This message or the guidance may be, for example, greetings such as "Good morning" or questions such as a quiz that encourage the target person to speak or perform an operation. When the message or the guidance is a question, this question preferably matches the preference of the target person and may be stored in the database 151 in association with the target person in advance. Further, the calling means 131 may analyze, based on the content that the target person has made an utterance or the content stored in the database 151, the preference of the target person using artificial intelligence techniques, and ask a question that matches the analyzed preference in response to the utterance made by the target person. By using the question that is associated with the target person, it is possible to encourage the target person to answer the question without getting bored with the conversation.

The database 151 stores the acoustic patterns in advance. These acoustic patterns are stored as acoustic events having the strength of a sound, the length of the sound, a temporal interval between the sound and another sound, the accent, the pattern of the intonation of the sound and the like of human coughing, throat clearing, sneezing, moaning, snoring, hiccups, or a loud noise. Further, the database 151 stores the telephone number and the e-mail address of the communication terminal 201-1 in association with the telephone number and the e-mail address of the communication terminal 201-2 in advance. The association that the database 151 stores is not limited to the telephone number and the e-mail address, and may be any kind of information that can be specified as the destination of communication. This information may be, for example, ID (identification information: IDentification) in a Social Networking Service (SNS) tool or a telephone call application such as LINE (registered trademark).

Figures 5, 6:
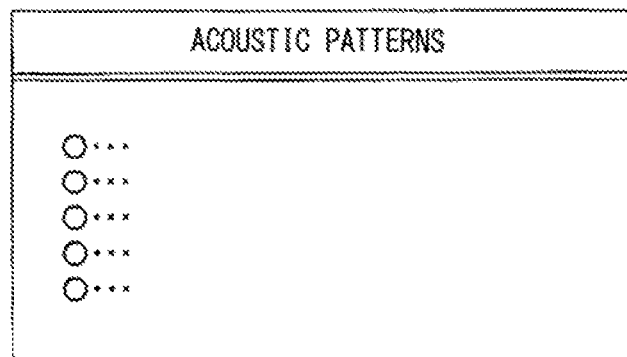
FIG. 5 is a diagram showing one example of acoustic patterns stored in a database shown in FIG. 4.
FIG. 6 is a diagram showing one example of correspondence of a telephone number and an e-mail address of a communication terminal stored in the database shown in FIG. 4.

FIG. 5 is a diagram showing one example of the acoustic patterns stored in the database 151 shown in FIG. 4. As shown in FIG. 5, a plurality of acoustic patterns are stored in the database 151 shown in FIG. 4 in advance.

FIG. 6 is a diagram showing one example of the association of the telephone number and the e-mail address of the communication terminal stored in the database 151 shown in FIG. 4. As shown in FIG. 6, the database 151 shown in FIG. 4 stores the telephone number and the e-mail address of the communication terminal of the target person in association with the telephone number and the e-mail address of the communication terminal of the destination of the notification. While the target person and the destination of the notification are associated with each other in one-to-one correspondence in the example shown in FIG. 6, they may be associated with each other in one-to-many correspondence.

The detection means 111 compares the acoustic pattern of the voice data transmitted from the communication terminal 201-1 with the acoustic patterns stored in the database 151. In particular, the detection means 111 compares the acoustic pattern of the voice data transmitted from the communication terminal 201-1 to which the calling means 131 has made a call with the acoustic patterns stored in the database 151. The detection means 111 detects an acoustic event based on the results of the comparison. When the difference between the patterns is within a predetermined range as a result of the comparison, the detection means 111 determines that an acoustic event has been detected. The detection means 111 compares, for example, the strength of the sound, the length of the sound, a temporal interval between the sound and another sound, the accent, the pattern of the intonation of the sound and the like of the voice data transmitted from the communication terminal 201-1 with the strength of a sound, the length of the sound, a temporal interval between the sound and another sound, the accent, the pattern of the intonation of the sound and the like stored in the database 151, and determines whether the difference between the patterns is within a predetermined range. This predetermined range may be set in advance and registered in the database 151. The detection means 111 performs comparison of, for example, the strength of a sound, the length of the sound, a temporal interval between the sound and another sound, the accent, the pattern of the intonation of the sound and the like. When the difference between the patterns and the strength of a sound, the length of the sound, a temporal interval between the sound and another sound, the accent, the pattern of the intonation of the sound and the like indicating the sound of throat clearing stored in the database 151 is within a predetermined range, it is determined that an acoustic event of "throat clearing" has been detected. By performing this comparison, it is possible to recognize that the condition (physical condition) of the target person who holds the communication terminal 201-1 is different from the normal condition (physical condition) or that something abnormal has happened to the target person.

When it is determined that the detection means 111 has detected an acoustic event as a result of the comparison in the detection means 111, the notification means 121 sends a predetermined notification. The notification means 121 sends this notification to the communication terminal 201-1. Alternatively, the notification means 121 sends this notification to the communication terminal 201-2. Alternatively, the notification means 121 sends this notification to both the communication terminal 201-1 and the communication terminal 201-2. The notification means 121 may send the notification using e-mail, send the notification using Short Message Service (SMS), send the notification using a voice call, or send the notification using other transmission media. The notification means 121 may send the notification when the results of the comparison in the detection means 111 show that the acoustic event is detected continuously for a predetermined period, like for several days. Further, this notification includes the content indicating that the condition (physical condition) of the target person seems to be different from the normal condition or the content suggesting actions to be taken.

The update means 141 updates the acoustic patterns stored in the database 151 based on the voice data transmitted from the communication terminal 201-1. That is, the update means 141 leans the voice data transmitted from the communication terminal 201-1 and reflects the results of the learning in the database 151.

Figure 7:
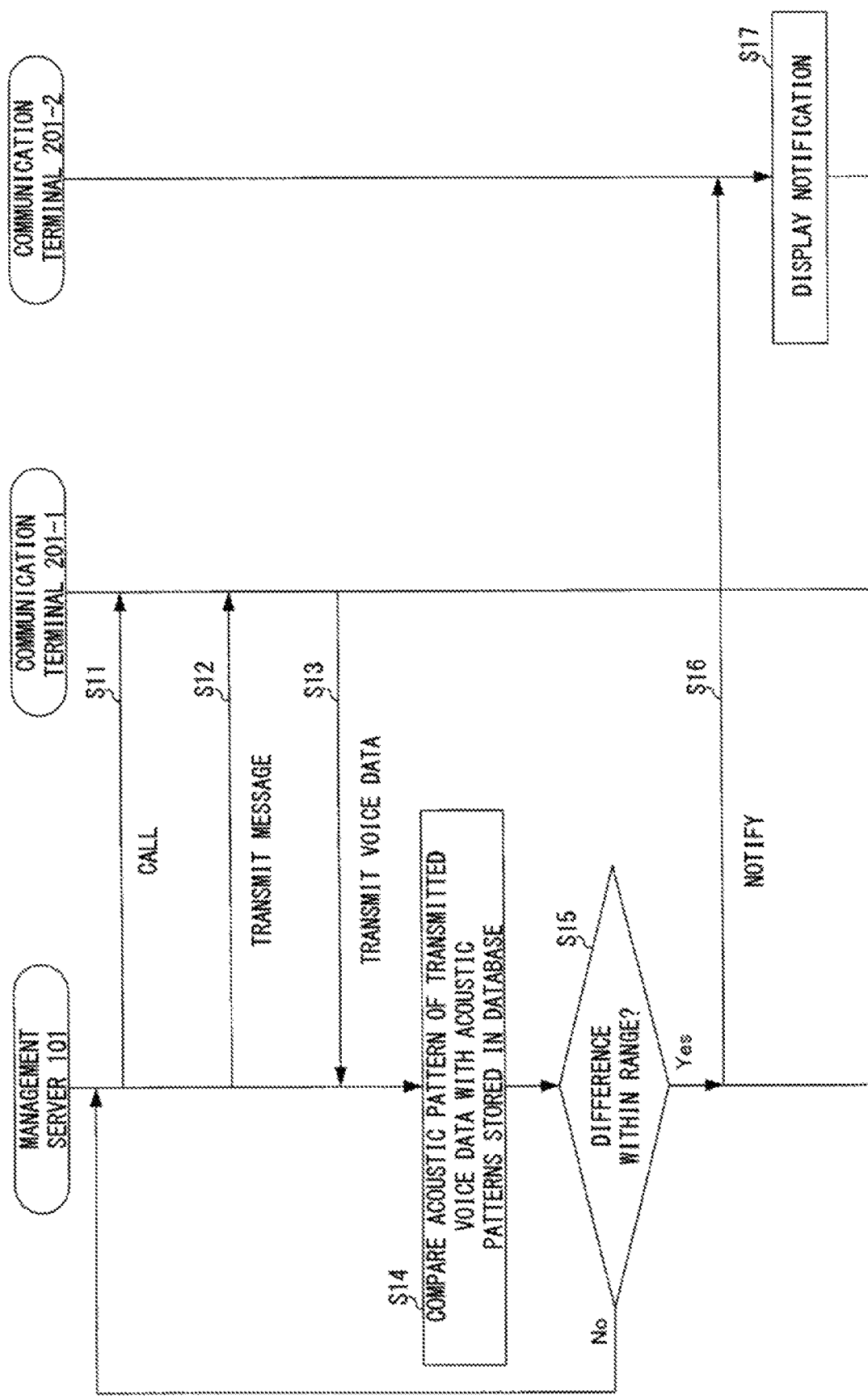
FIG. 7 is a sequence diagram illustrating one example of the notification method in the notification system shown in FIG. 3.

In the following description, the notification method in the notification system shown in FIG. 3 will be explained. FIG. 7 is a sequence diagram illustrating one example of the notification method in the notification system shown in FIG. 3. In this example, an example in which the notification means 121 shown in FIG. 4 sends a notification to the communication terminal 201-2 will be explained.

First, the calling means 131 makes a call to the communication terminal 201-1 held by the target person (Step S11). When the communication terminal 201-1 responds (off the hook), the calling means 131 transmits a message (or a guidance) to the communication terminal 201-1 (Step S12).

After that, when the person who holds the communication terminal 201-1 makes a speech, the communication terminal 201-1 transmits the uttered voice data to the management server 101 (Step S13).

After the voice data is transmitted from the communication terminal 201-1, the detection means 111 compares the acoustic pattern of the voice data transmitted from the communication terminal 201-1 with the acoustic patterns stored in the database 151 (Step S14). Specifically, the detection means 111 compares the strength of a sound, the length of the sound, a temporal interval between the sound and another sound, the accent, the pattern of the intonation of the sound and the like of the voice data transmitted from the communication terminal 201-1 with the strength of a sound, the length of the sound, a temporal interval between the sound and another sound, the accent, the pattern of the intonation of the sound and the like stored in the database 151. The detection means 111 determines, from the results of the comparison, whether the difference between the patterns is within a predetermined range (Step S15). When the results of the comparison show that the difference between the patterns is within the predetermined range, the detection means 111 determines that the acoustic event has been detected.

When it is determined from the results of the comparison in the detection means 111 that the detection means 111 has detected an acoustic event, the notification means 121 sends a predetermined notification to the communication terminal 201-2 (Step S16). When the notification means 121 sends the notification using e-mail, the notification means 121 reads out the e-mail address of the communication terminal 201-2 associated with the communication terminal 201-1 from the database 151 and sends a notification to the e-mail address that has been read out. When the notification means 121 sends a notification using SMS, the notification means 121 reads out the telephone number of the communication terminal 201-2 associated with the communication terminal 201-1 from the database 151 and sends a notification to the telephone number that has been read out.

The communication terminal 201-2 that has received the notification from the management server 101 displays the received notification (Step S17). When the notification transmitted from the management server 101 is the one that uses an e-mail, the communication terminal 201-2 displays the notification in the normal method of displaying the notification upon receiving the e-mail. The same holds true for a case in which this notification is sent using SMS.

Figure 8:
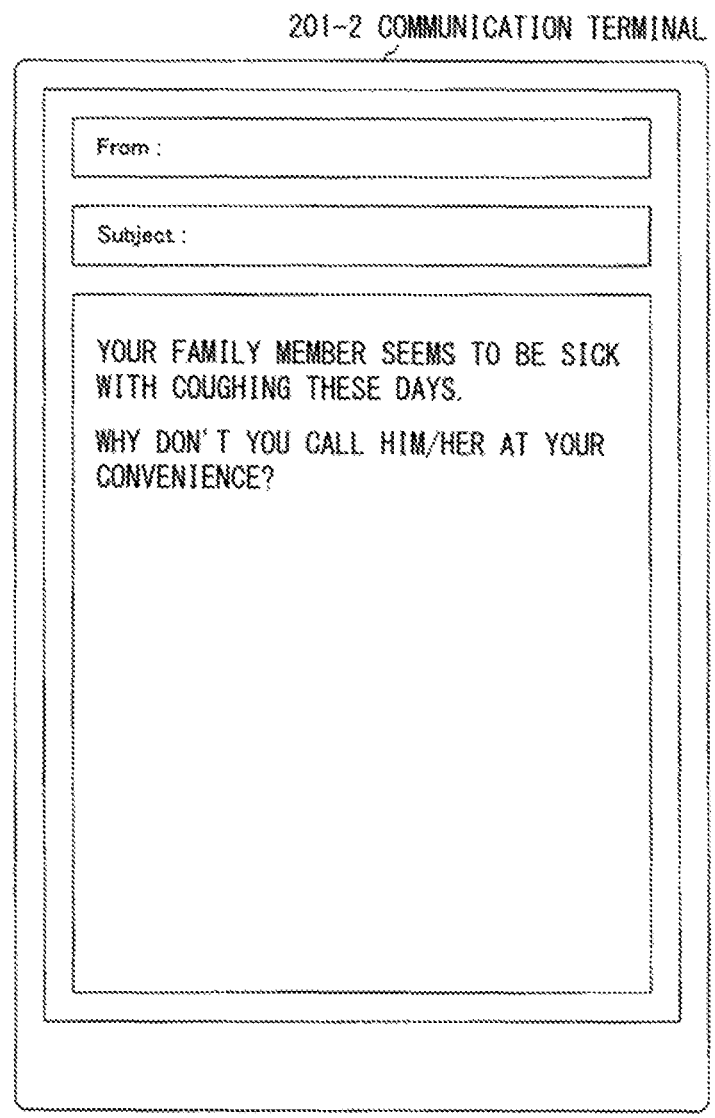
FIG. 8 is a diagram showing one example of display modes in which the communication terminal shown in FIG. 3 displays a notification.

FIG. 8 is a diagram showing one example of display modes in which the communication terminal 201-2 shown in FIG. 3 displays the notification. The example shown in FIG. 8 shows a display mode in the communication terminal 201-2 when the notification means 121 sends a notification using e-mail. Upon receiving the notification using e-mail from the management server 101, the communication terminal 201-2 shown in FIG. 3 displays the notification using an e-mail application. In the example shown in FIG. 8, the communication terminal 201-2 displays the notification "Your family member seems to be sick with coughing these days. Why don't you call him/her at your convenience?" using e-mail.

Figure 9:
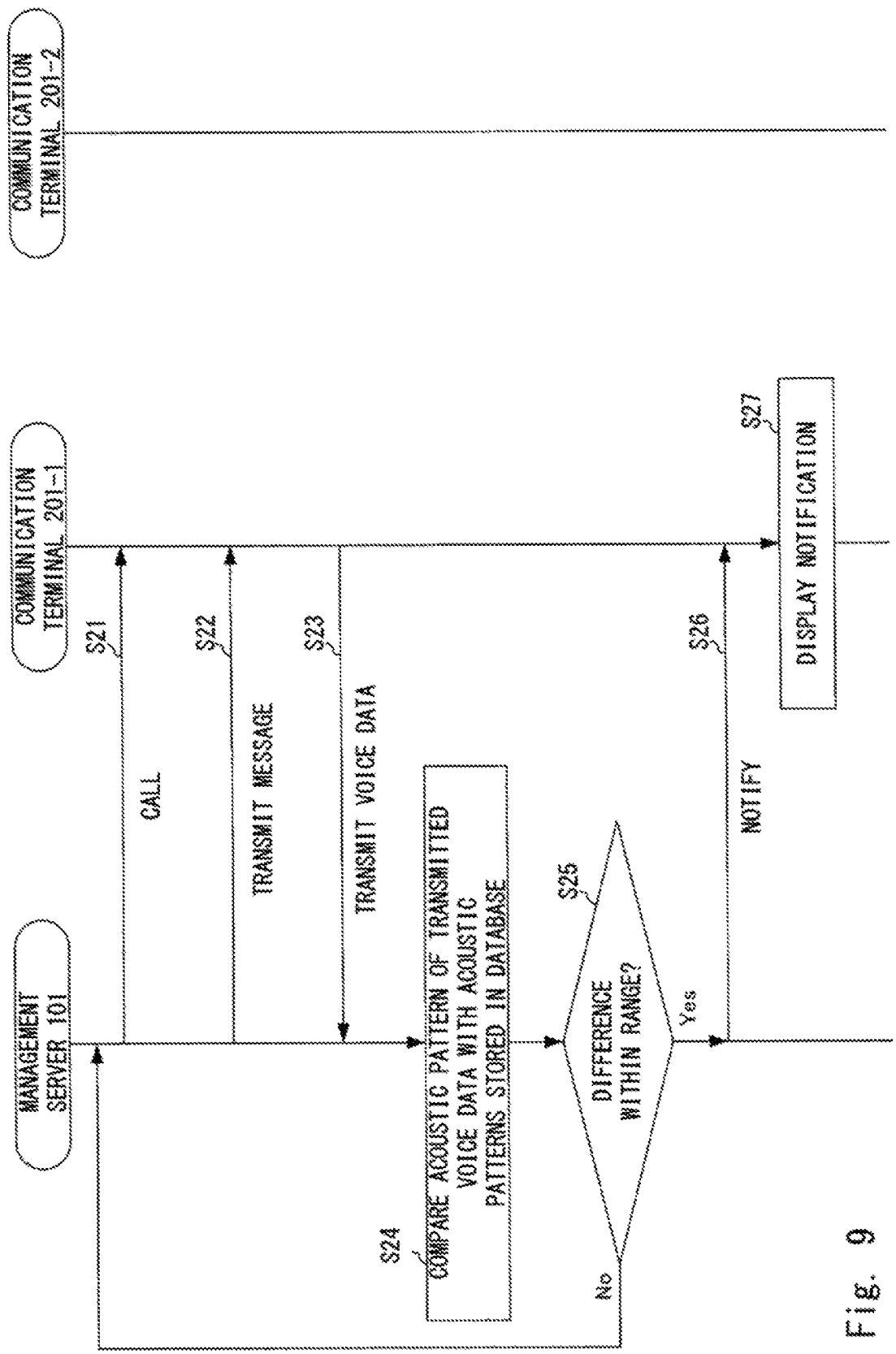
FIG. 9 is a sequence diagram illustrating another example of the notification method in the notification system shown in FIG. 3.

FIG. 9 is a sequence diagram illustrating another example of the notification method in the notification system shown in FIG. 3. In this example, a case in which the notification means 121 shown in FIG. 4 sends a notification to the communication terminal 201-1 will be explained as an example.

First, the calling means 131 makes a call to the communication terminal 201-1 held by the target person (Step S21). After the communication terminal 201-1 responds (off the hook), the calling means 131 transmits a message (or a guidance) to the communication terminal 201-1 (Step S22).

After that, when the person who holds the communication terminal 201-1 makes a speech, the communication terminal 201-1 transmits the uttered voice data to the management server 101 (Step S23).

After the voice data is transmitted from the communication terminal 201-1, the detection means 111 compares the acoustic pattern of the voice data transmitted from the communication terminal 201-1 with the acoustic patterns stored in the database 151 (Step S24). Specifically, the detection means 111 compares the strength of a sound, the length of the sound, a temporal interval between the sound and another sound, the accent, the pattern of the intonation of the sound and the like of the voice data transmitted from the communication terminal 201-1 with the strength of a sound, the length of the sound, a temporal interval between the sound and another sound, the accent, the pattern of the intonation of the sound and the like stored in the database 151. The detection means 111 determines, from the results of the comparison, whether the difference between the patterns is within a predetermined range (Step S25). When the difference between the patterns is within a predetermined range as a result of the comparison, the detection means 111 determines that the acoustic event has been detected.

When it is determined that the detection means 111 has detected the acoustic event from the results of the comparison in the detection means 111, the notification means 121 sends a predetermined notification to the communication terminal 201-1 (Step S26). When the notification means 121 sends a notification using e-mail, the notification means 121 reads out the e-mail address of the communication terminal 201-1 from the database 151 and sends a notification to the e-mail address that has been read out. When the notification means 121 sends the notification using SMS, the notification means 121 sends the notification to the telephone number of the communication terminal 201-1 used when the calling has been made.

The communication terminal 201-1 that has received the notification from the management server 101 displays the received notification (Step S27). When the notification transmitted from the management server 101 is the one that uses an e-mail, the communication terminal 201-1 displays the notification in the normal method of displaying the notification upon receiving the e-mail. The same holds true for a case in which this notification is sent using SMS.

Figure 10:
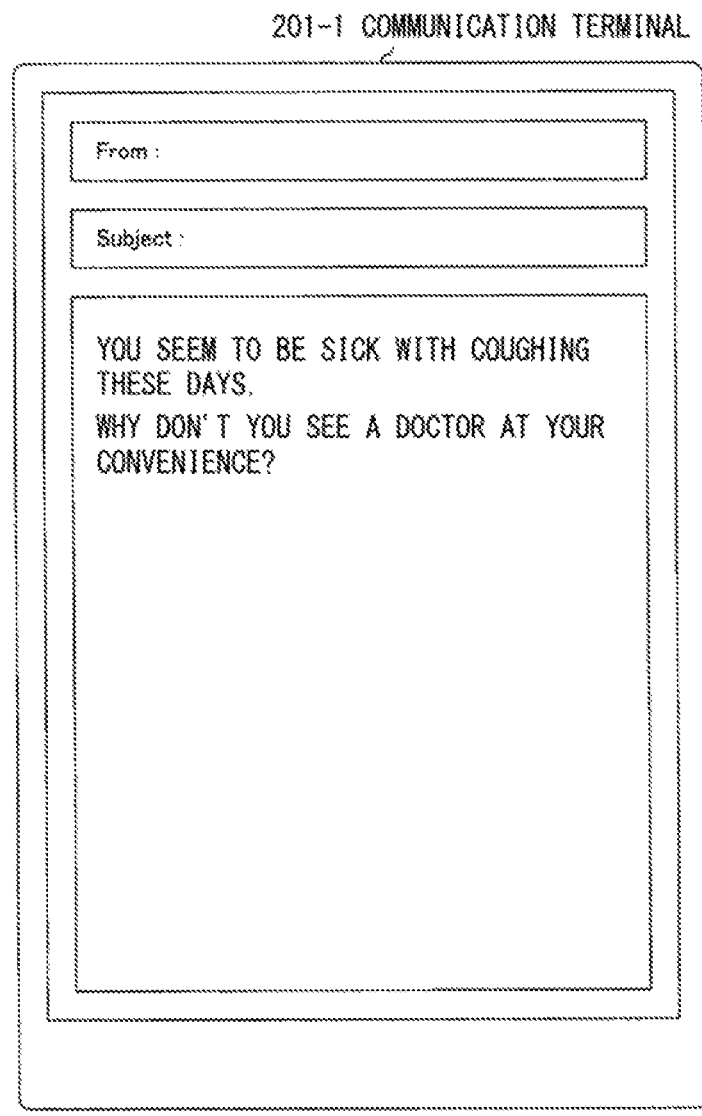
FIG. 10 is a diagram showing one example of display modes in which the communication terminal shown in FIG. 3 displays a notification.

FIG. 10 is a diagram showing one example of display modes in which the communication terminal 201-1 shown in FIG. 3 displays the notification. The example shown in FIG. 10 shows a display mode in the communication terminal 201-1 when the notification means 121 sends a notification using e-mail. Upon receiving the notification using e-mail from the management server 101, the communication terminal 201-1 shown in FIG. 3 displays this notification using an e-mail application. In the example shown in FIG. 10, the communication terminal 201-1 displays the notification "You seem to be sick with coughing these days. Why don't you see a doctor at your convenience?" using e-mail.

Even when the calling means 131 does not make a call and the communication terminal 201-1 makes a call instead, processing of Steps S23-S27 may be performed after that.

Modified Example 1

The management server 101 may store, for each of the target persons, the sounds of coughing, throat clearing, sneezing, moaning, snoring, hiccups and the like of the target person in the database 151 as the target person acoustic patterns in advance. In this case, the detection means 111 may read out, from the database 151, the target person acoustic pattern of the target person who has transmitted the voice data and holds the communication terminal, and compare the acoustic pattern of the voice data transmitted from the communication terminal 201-1 with the target person acoustic pattern of the target person who holds the communication terminal 201-1 read out from the database 151. As described above, by comparing the data of the target person with another piece(s) of data of the same person, it is possible to perform determination more accurately.

As described above, in this example embodiment, the management server 101 transmits a message or a guidance to the communication terminal 201-1. The management server 101 compares the acoustic pattern of the voice data transmitted from the communication terminal 201-1 in response to the message or the guidance transmitted from the management server 101 with the acoustic patterns registered in advance. When the difference between the patterns is within a predetermined range, a notification is sent to the communication terminal 201-1 or the communication terminal 201-2. Therefore, the target person who holds the communication terminal 201-1 or one of the family members who holds the communication terminal 201-2 is able to obtain accurate information of the condition (state) of the target person who holds the communication terminal 201-1. Further, when the difference between the acoustic pattern of the voice data transmitted from the communication terminal 201-1 and the acoustic patterns registered in advance is outside the predetermined range, the management server 101 does not send a notification. It is therefore possible to prevent an increase in the communication traffic, which is due to unnecessary notifications.

Third Example Embodiment

Figure 11:
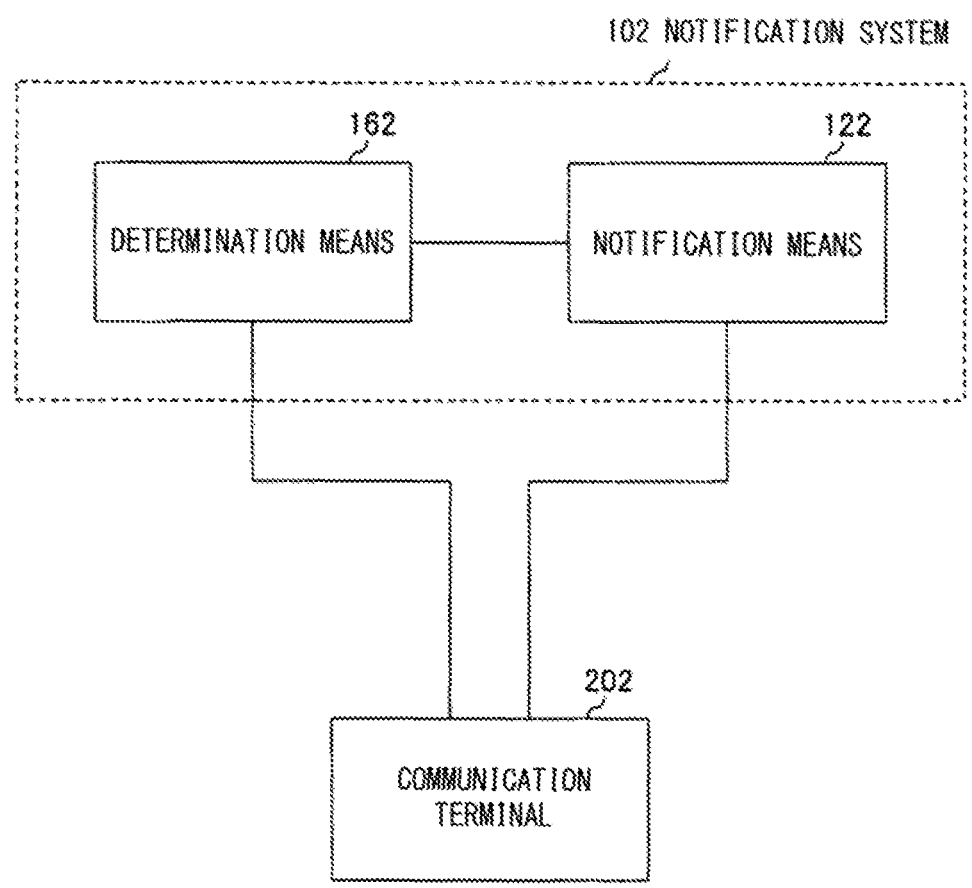
FIG. 11 is a diagram showing a third example embodiment of the notification system according to the present disclosure.

FIG. 11 is a diagram showing a third example embodiment of the notification system according to the present disclosure. As shown in FIG. 11, a notification system 102 according to this example embodiment includes determination means 162 and notification means 122.

The determination means 162 determines whether the content of the operation performed on a communication terminal 202 held by the target person satisfies predetermined conditions.

When the determination means 162 has determined that the content of the operation does not satisfy the predetermined conditions, the notification means 122 sends a predetermined notification.

Figure 12:
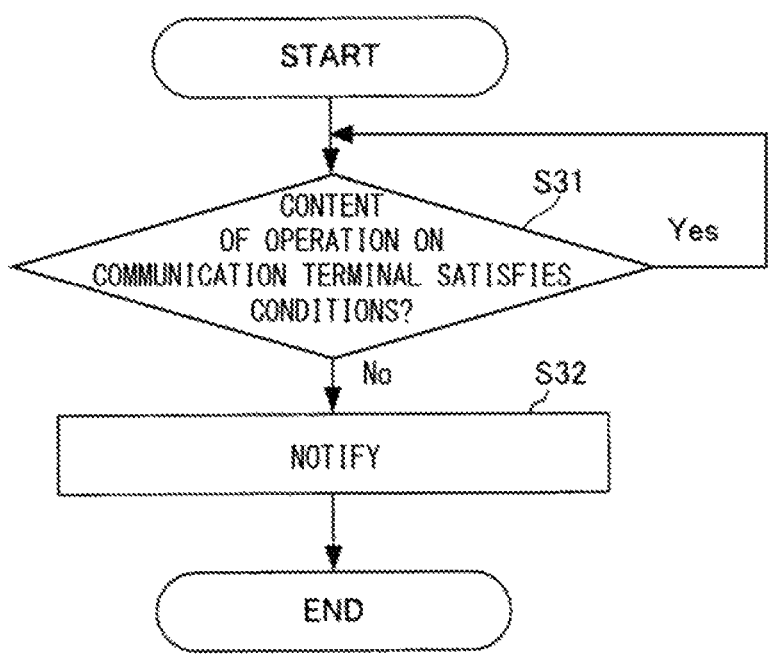
FIG. 12 is a flowchart for explaining one example of a notification method in the notification system shown in FIG. 11.

In the following description, a notification method in the notification system 102 shown in FIG. 11 will be explained. FIG. 12 is a flowchart for explaining one example of the notification method in the notification system 102 shown in FIG. 11.

First, the determination means 162 determines whether the content of the operation performed on the communication terminal 202 held by the target person satisfies predetermined conditions (Step S31). When the determination means 162 determines that the content of the operation does not satisfy the predetermined conditions, the notification means 122 sends a predetermined notification (Step S32).

As described above, the notification system 102 according to this example embodiment sends a notification when the operation method performed on the communication terminal 202 by the target person is outside the predetermined range. Therefore, it is possible to obtain accurate information regarding the state of the target person who holds the communication terminal 202.

Fourth Example Embodiment

Figure 13:
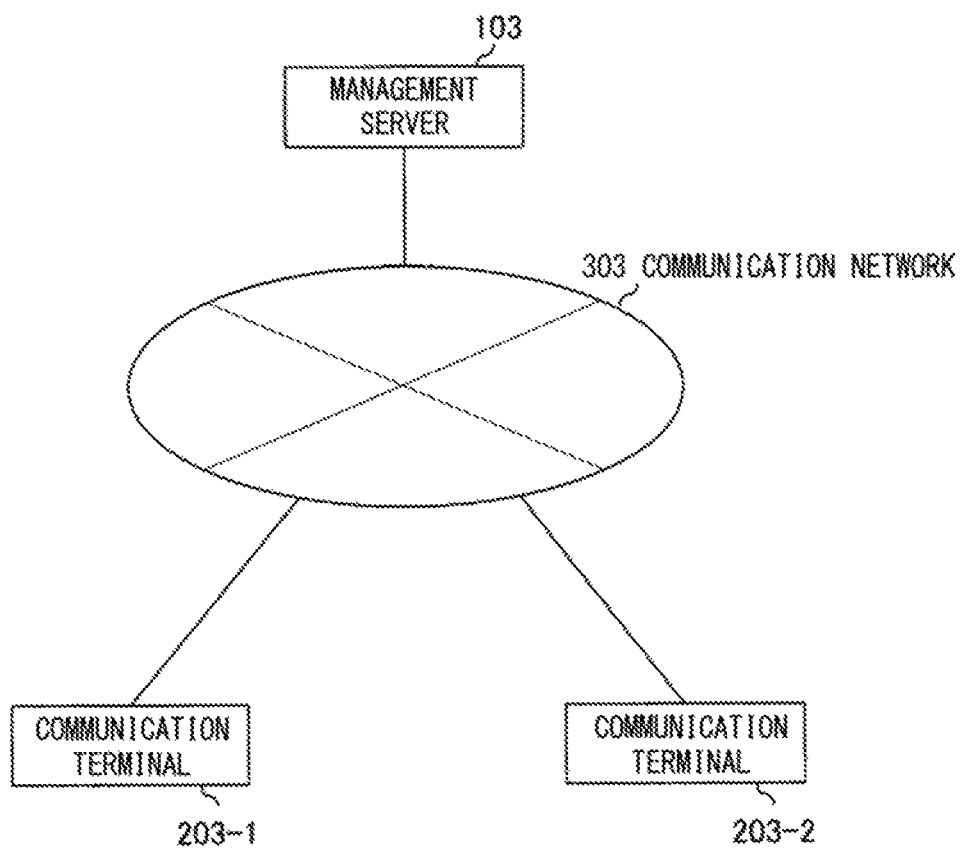
FIG. 13 is a diagram showing a fourth example embodiment of the notification system according to the present disclosure.

FIG. 13 is a diagram showing a fourth example embodiment of the notification system according to the present disclosure. The notification system according to this example embodiment is implemented by an apparatus of a management server 103. As shown in FIG. 13, this example embodiment includes a management server 103, which is the notification system, and communication terminals 203-1 and 203-2. The management server 103 and the communication terminals 203-1 and 203-2 are connected to each other via a communication network 303.

The communication terminal 203-1 is a communication apparatus such as a mobile terminal held by the target person. The communication terminal 203-2 is a communication apparatus such as a mobile terminal held by one of family members or relatives of the target person. The telephone numbers and the e-mail addresses of the communication terminals 203-1 and 203-2 are registered in the management server 103 in association with each other in advance.

Figure 14:
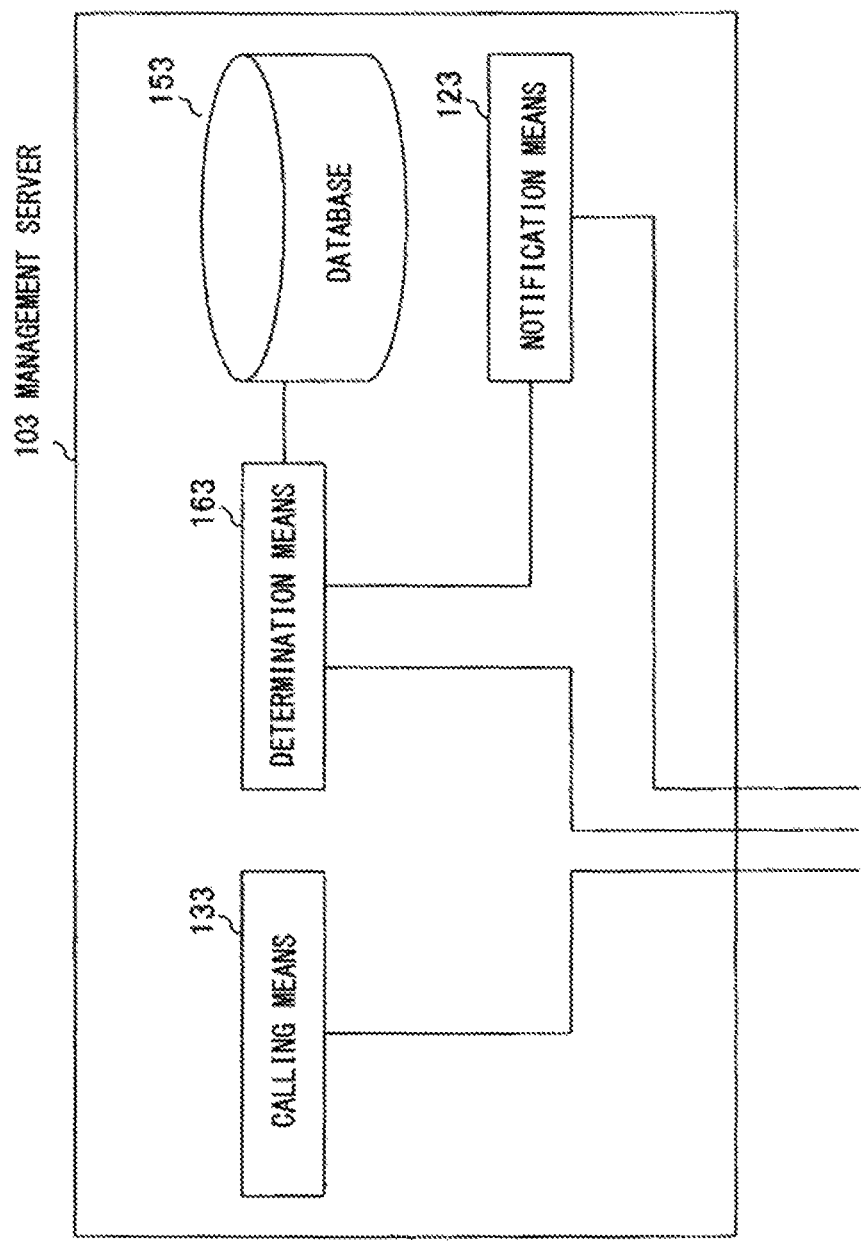
FIG. 14 is a diagram showing one example of an internal configuration of a management server shown in FIG. 13.

FIG. 14 is a diagram showing one example of an internal configuration of the management server 103 shown in FIG. 13. As shown in FIG. 14, the management server 103 shown in FIG. 13 includes calling means 133, a database 153, determination means 163, and notification means 123. FIG. 14 shows one example of main components that relate to this example embodiment among the components included in the management server 103 shown in FIG. 13.

The calling means 133 makes a call to the communication terminal 203-1 held by the target person. The calling means 133 further transmits at least one of a message and a display screen for prompting the communication terminal 203-1 to be operated to the communication terminal 203-1 held by the target person.

The database 153 stores predetermined conditions in advance. The database 153 stores the telephone number and the e-mail address of the communication terminal 203-1 and the conditions in association with each other in advance. Further, the database 153 stores the telephone number and the e-mail address of the communication terminal 203-1 and the telephone number and the e-mail address of the communication terminal 203-2, which is the destination of the notification, in association with each other in advance.

FIG. 15 is a diagram showing one example of the conditions stored in the database 153 shown in FIG. 14. As shown in FIG. 15, the database 153 shown in FIG. 14 stores the telephone number of the target person, the e-mail address, and the operation item and the operation range, which are the conditions, in association with one another. The conditions are the content of the operation in which the target person operates the communication terminal 203-1. The conditions may be, as shown in FIG. 15, time from the timing when the call is made to the timing when the call is answered or time from the timing when the call is answered to the timing when the call is disconnected. Further, the conditions may be time regarding voice communication such as time from the timing when a question is made to the communication terminal 203-1 to the timing when the reply to this question is sent from the communication terminal 203-1. The operation range is a range calculated based on the operation performed by the target person in the normal state for each of the contents of the operation, and is a criterion for causing the determination means 163 to determine whether the notification means 123 sends a notification. Further, only the conditions shown in FIG. 15 may be stored in the database 153.

FIG. 16 is a diagram showing another example of the conditions stored in the database 153 shown in FIG. 14. As shown in FIG. 16, the database 153 shown in FIG. 14 stores the display state and the content of the operation in association with each other as the conditions. The conditions are the content of the operation in which the target person operates the communication terminal 203-1. This content is, for example, the content of the operation that can be assumed to be performed on the display on the communication terminal 203-1. As shown in FIG. 16, for example, when the communication terminal 203-1 displays buttons of A-D, the condition of the content of the operation is that one of the buttons A-D is touched. That is, when the communication terminal 203-1 displays the buttons of A-D, it is determined that the condition is not satisfied when, for example, an area other than the area where these buttons are displayed is touched. Further, when the communication terminal 203-1 displays a character input screen, the condition of the content of the operation is to perform a touching operation for inputting characters that can be converted into other characters. That is, when the communication terminal 203-1 displays the character input screen, it is determined that the condition is not satisfied when, for example, a touching operation other than the touching operation for inputting characters that can be converted into other characters (e.g., a touching operation for inputting characters that cannot be converted into other characters) is performed.

In addition to the above, the conditions stored in the database 153 may be, for example, whether or not a certain specific button (a software button or a hardware button) continues to be pressed, whether a button that can be expected to be pressed in response to a display or voice is being pressed (for example, whether the buttons are being pressed in the normal order in accordance with the display, or whether the button in accordance with the voice is being pressed).

The determination means 163 compares the content of the operation performed on the communication terminal 203-1 by the target person with the conditions stored in the database 153. In particular, the determination means 163 compares the content of the operation performed on the communication terminal 203-1 to which the calling means 133 has made a call with the conditions stored in the database 153. This content of the operation may be the one indicated by operation information indicating the content of the operation performed on the communication terminal 203-1 by the target person transmitted from the communication terminal 203-1. The determination means 163 determines whether the content of the operation performed on the communication terminal 203-1 by the target person satisfies the conditions stored in the database 153. By performing the determination using the aforementioned conditions, it is possible to detect that the content of the operation performed on the communication terminal 203-1 will be outside of the range of the normal operation method since the condition (physical condition) of the target person who holds the communication terminal 203-1 is different from the normal condition. As a result, it is possible to recognize that the condition (physical condition) of the target person is not good.

When the determination means 163 determines that the content of the operation performed on the communication terminal 203-1 by the target person does not satisfy the conditions stored in the database 153, the notification means 123 sends a predetermined notification. The notification means 123 sends this notification to the communication terminal 203-1. Alternatively, the notification means 123 sends this notification to the communication terminal 203-2. Alternatively, the notification means 123 sends this notification to both the communication terminal 203-1 and the communication terminal 203-2. The notification means 123 may send the notification using e-mail, send the notification using SMS, or send the notification using a voice call. The notification means 123 may send the notification when the determination means 163 has continuously determined that the content of the operation performed on the communication terminal 203-1 by the target person does not satisfy the conditions stored in the database 153 for a predetermined period, like for several days. Further, this notification may contain the content indicating that the condition of the target person seems to be different from the normal condition or the content for suggesting actions to be taken.

Figure 17:
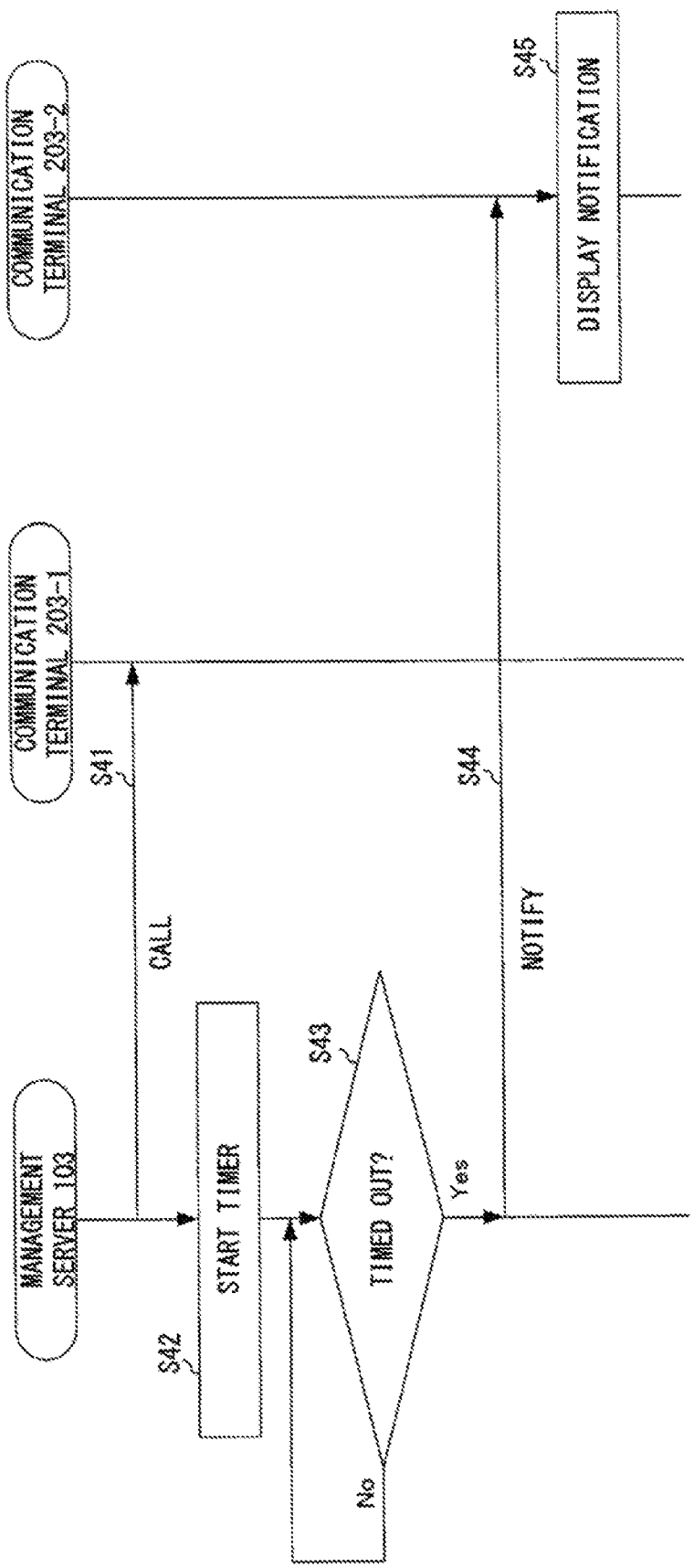
FIG. 17 is a sequence diagram illustrating one example of the notification method in the notification system shown in FIG. 13.

In the following description, the notification method in the notification system shown in FIG. 13 will be explained. FIG. 17 is a sequence diagram illustrating one example of the notification method in the notification system shown in FIG. 13. In this example, a case in which the notification means 123 shown in FIG. 14 sends the notification to the communication terminal 203-2 will be described as an example. Further, a case in which the operation method (condition) compared by the determination means 163 shown in FIG. 14 is time from the timing when the calling means 133 has made a call to the communication terminal 203-1 to the timing when the communication terminal 203-1 responds (the target person of the communication terminal 203-1 answers the telephone) will be explained as an example.

First, the calling means 133 makes a call to the communication terminal 203-1 held by the target person (Step S41). Then the determination means 163 starts a timer (not shown) (Step S42). This timer stops when the communication terminal 203-1 responds. Further, as shown in FIG. 15, the determination means 163 determines that the timer has timed out when the value of the timer reaches the value of the operation item stored in the database 153 in advance.

The determination means 163 determines whether the timer has timed out before the communication terminal 203-1 responds (Step S43). When the determination means 163 determines that the timer has timed out before the communication terminal 203-1 responds, the notification means 123 sends a predetermined notification to the communication terminal 203-2 (Step S44). When the notification means 123 sends a notification using e-mail, the notification means 123 reads out the e-mail address of the communication terminal 203-2 associated with the communication terminal 203-1 from the database 153 and sends a notification to the e-mail address that has been read out. When the notification means 123 sends the notification using SMS, the notification means 123 reads out the telephone number of the communication terminal 203-2 associated with the communication terminal 203-1 from the database 153 and sends a notification to the telephone number that has been read out.

The communication terminal 203-2 that has received the notification from the management server 103 displays the received notification (Step S45). When the notification transmitted from the management server 103 is the one that uses an e-mail, the communication terminal 203-2 displays the notification in the normal method of displaying the notification upon receiving the e-mail. The same holds true for a case in which this notification is sent using SMS.

Figure 18:
FIG. 18 is a diagram showing one example of display modes in which the communication terminal shown in FIG. 13 displays a notification.

FIG. 18 is a diagram showing one example of display modes when the communication terminal 203-2 shown in FIG. 13 displays a notification. The example shown in FIG. 18 shows a display mode in the communication terminal 203-2 when the notification means 123 sends a notification using e-mail. Upon receiving a notification using e-mail from the management server 103, the communication terminal 203-2 shown in FIG. 13 displays this notification using an e-mail application. In the example shown in FIG. 18, the communication terminal 203-2 displays a notification "Your family member seems to be sick these days. Why don't you visit him/her?" using e-mail.

Figure 19:
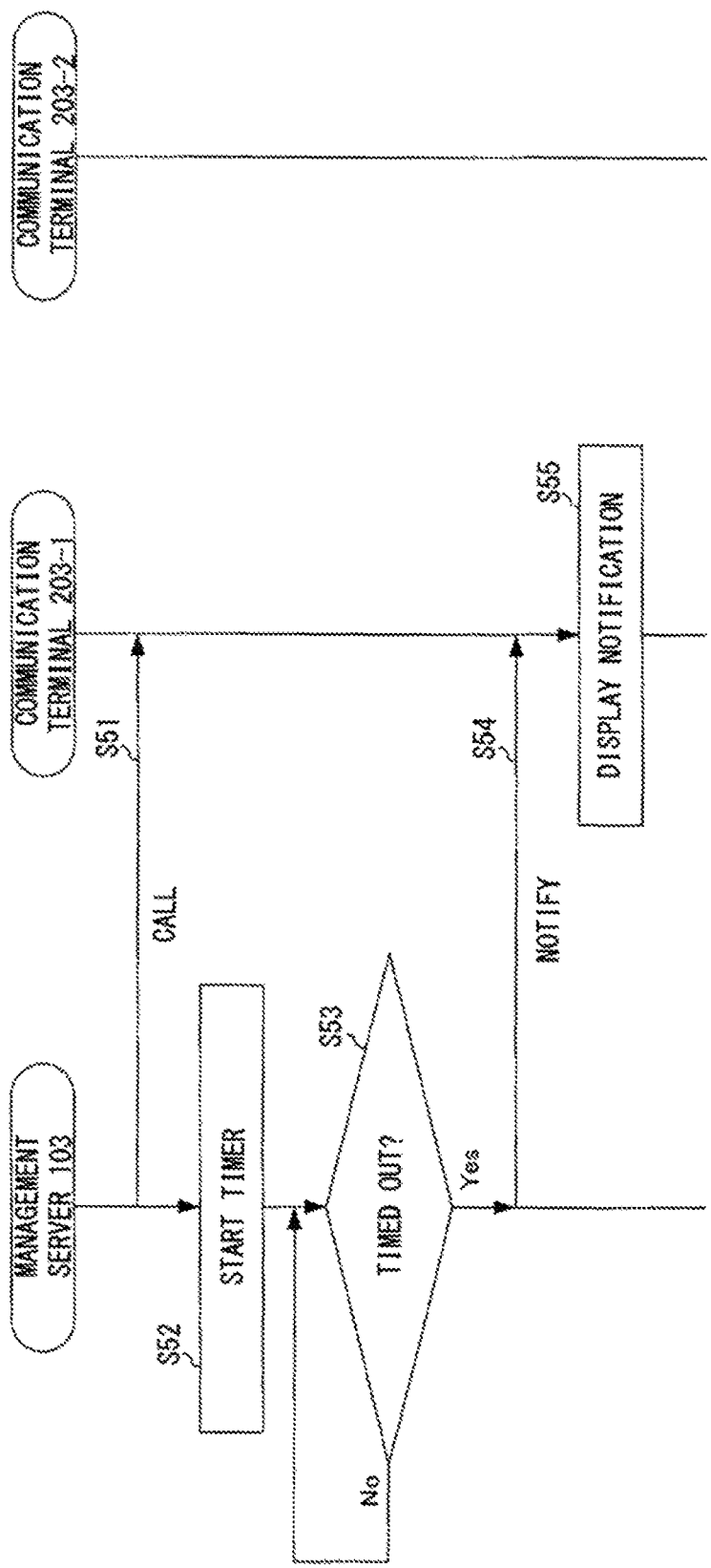
FIG. 19 is a sequence diagram illustrating another example of the notification method in the notification system shown in FIG. 13.

FIG. 19 is a sequence diagram illustrating another example of the notification method in the notification system shown in FIG. 13. In this example, a case in which the notification means 123 shown in FIG. 14 sends the notification to the communication terminal 203-1 will be explained as an example. Further, a case in which the operation method (conditions) compared by the determination means 163 shown in FIG. 14 is time from the timing when the calling means 133 has made a call to the communication terminal 203-1 to the timing when the communication terminal 203-1 responds (the target person who holds the communication terminal 203-1 answers the telephone) will be explained as an example.

First, the calling means 133 makes a call to the communication terminal 203-1 held by the target person (Step S51). Then the determination means 163 starts a timer (not shown) (Step S52). This timer stops when the communication terminal 203-1 responds. Further, as shown in FIG. 15, the determination means 163 determines that the timer has timed out when the value of the timer reaches the value of the operation item stored in the database 153 in advance.

The determination means 163 determines whether the timer has timed out before the communication terminal 203-1 responds (Step S53). When the determination means 163 determines that the timer has timed out before the communication terminal 203-1 responds, the notification means 123 sends a predetermined notification to the communication terminal 205-1 (Step S54). When the notification means 123 sends a notification using e-mail, the notification means 123 reads out the e-mail address of the communication terminal 203-1 from the database 153 and sends a notification to the e-mail address that has been read out. When the notification means 123 sends the notification using SMS, the notification means 123 sends a notification to the telephone number of the communication terminal 203-1 used when the calling has been made.

The communication terminal 203-1 that has received the notification from the management server 103 displays the received notification (Step S55). When the notification transmitted from the management server 103 is the one that uses an e-mail, the communication terminal 203-1 displays the notification in the normal method of displaying the notification upon receiving the e-mail. The same holds true for a case in which this notification is sent using SMS.

Figure 20:
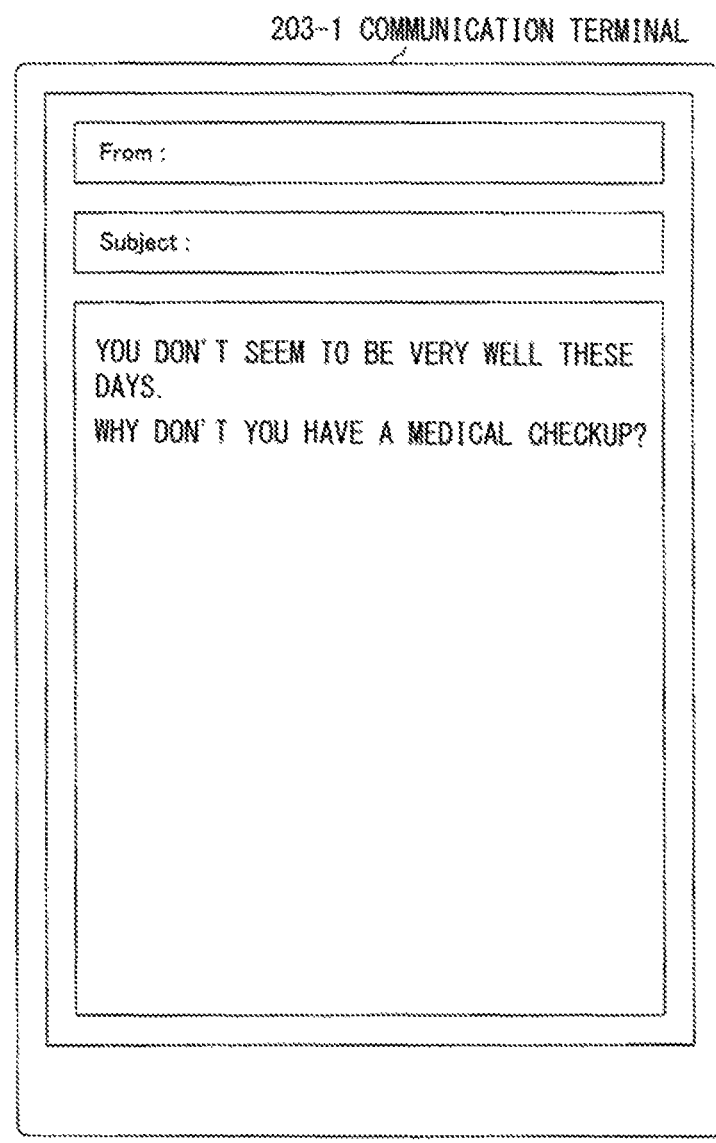
FIG. 20 is a diagram showing one example of display modes in which the communication terminal shown in FIG. 13 displays a notification.

FIG. 20 is a diagram showing one example of display modes in which the communication terminal 203-1 shown in FIG. 13 displays a notification. The example shown in FIG. 20 shows a display mode in the communication terminal 203-1 when the notification means 123 sends the notification using e-mail. When the communication terminal 203-1 shown in FIG. 13 receives a notification using e-mail from the management server 103, the communication terminal 203-1 displays this notification using an e-mail application. In the example shown in FIG. 20, the communication terminal 203-1 displays the notification "You don't seem to be very well these days. Why don't you have a medical checkup?" using e-mail.

As described above, according to this example embodiment, the management server 103 compares the method of operating the communication terminal 203-1 performed by the target person with the operation method registered in the database 153 in advance. When the operation method performed on the communication terminal 203-1 by the target person does not satisfy the operation method (conditions) registered in the database 153 in advance, a notification is sent to the communication terminal 203-1 or the communication terminal 203-2. Therefore, the target person who holds the communication terminal 203-1, a family member who holds the communication terminal 203-2 or the like can obtain accurate information regarding the state of the target person who holds the communication terminal 203-1. Further, when the method of operating the communication terminal 203-1 performed by the target person satisfies the operation method (conditions) registered in the database 153 in advance, the management server 103 does not send the notification. It is therefore possible to prevent an increase in the communication traffic, which is due to unnecessary notifications.

In the aforementioned descriptions, after the calling means 133 has made a call to the communication terminal 203-1 of the target person, the determination means 163 determines whether the operation method performed on the communication terminal 203-1 satisfies the conditions stored in the database 153, and the notification means 123 sends the notification based on the results of the determination. However, the present disclosure is not limited thereto. After the communication terminal 203-1 held by the target person has sent the notification to the communication terminal 203-2, the determination means 163 may determine whether the operation method performed on the communication terminal 203-1 satisfies the conditions stored in the database 153, and the notification means 123 may send the notification based on the results of the determination.

While the above descriptions have been made assuming that the respective components play the respective functions (processing), this allocation is not limited to the one described above. Further, the aforementioned forms of the configurations of the components are merely examples, and they are not limited thereto. Further, each of the example embodiments may be combined with each other.

The processing performed by each of the components provided in each of the notification systems 100 and 102 and the management servers 101 and 103 described above may be performed by logic circuits each manufactured in accordance with its purposes. Further, a computer program (hereinafter this computer program will be referred to as a program) that describes the content of the processing as a procedure may be recorded in a storage medium that can be read by each of the notification systems 100 and 102 and the management servers 101 and 103, the program recorded in this storage medium may be read by each of the notification systems 100 and 102 and the management servers 101 and 103, and each of the notification systems 100 and 102 and the management servers 101 and 103 may execute the recorded program. The storage media that can be read by each of the notification systems 100 and 102 and the management servers 101 and 103 indicate, besides transportable storage media such as floppy (registered trademark) disks, optical magnetic discs, DVDs (Digital Versatile Discs), CDs (Compact Discs), Blu-ray (registered trademark) Discs, USB (Universal Serial Bus) memories, memories such as ROM (Read Only Memory) or RAM (Random Access Memory) included in each of the notification systems 100 and 102 and the management servers 101 and 103, HDD (Hard Disc Drive) and the like. The program recorded in this storage media is read by CPUs provided in the notification systems 100 and 102 and the management servers 101 and 103, and processing similar to that described above is performed by control performed by the CPU. The CPU operates as a computer that executes the program read by the storage media that stores the program.

While the present application has been described above with reference to the example embodiments, the present application is not limited to the aforementioned descriptions. Various changes that can be understood by one skilled in the art may be made to the configurations and the details of the present application within the scope of the invention.

A part or all of the aforementioned example embodiments may be described as shown in the following Supplementary Notes. However, they are not limited thereto.

(Supplementary Note 1)
A notification system comprising:
  detection means for detecting an acoustic event from voice data transmitted from a communication terminal held by a target person; and
  notification means for sending a predetermined notification when the detection means has detected the acoustic event.

(Supplementary Note 2)
The notification system according to Supplementary Note 1, comprising a database configured to store predetermined acoustic patterns in advance,
  wherein the detection means compares an acoustic pattern of the voice data transmitted from the communication terminal with the acoustic patterns stored in the database and detects the acoustic event based on the results of the comparison.

(Supplementary Note 3)
The notification system according to Supplementary Note 2, comprising update means for updating the acoustic patterns stored in the database based on the voice data transmitted from the communication terminal.

(Supplementary Note 4)
The notification system according to Supplementary Note 2 or 3, wherein the detection means determines that the acoustic event has been detected when the results of the comparison show that the difference between the patterns is within a predetermined range.

(Supplementary Note 5)
The notification system according to any one of Supplementary Notes 1 to 4, comprising calling means for making a call to the communication terminal,
  wherein the detection means detects an acoustic event from the voice data transmitted from the communication terminal to which the calling means has made a call.

(Supplementary Note 6)
The notification system according to Supplementary Note 5, wherein the calling means transmits a message for encouraging the target person to speak to the communication terminal held by the target person.

(Supplementary Note 7)
A notification system comprising:
  determination means for determining whether the content of an operation performed on a communication terminal held by a target person satisfies predetermined conditions; and
  notification means for sending a predetermined notification when the determination means determines that the content of the operation does not satisfy the predetermined conditions.

(Supplementary Note 8)
The notification system according to Supplementary Note 7, wherein the determination means determines whether the content of the operation performed on the communication terminal indicated by operation information transmitted from the communication terminal satisfies the predetermined conditions.

(Supplementary Note 9)
The notification system according to Supplementary Note 7 or 8, comprising a database configured to store the predetermined conditions in advance,
  wherein the determination means compares the content of the operation performed on the communication terminal with the conditions stored in the database and determines whether the predetermined conditions are satisfied.

(Supplementary Note 10)
The notification system according to any one of Supplementary Notes 7 to 9, comprising calling means for making a call to the communication terminal,
  wherein the determination means determines whether the content of the operation performed on the communication terminal to which the calling means has made a call satisfies the predetermined conditions.

(Supplementary Note 11)
The notification system according to Supplementary Note 10, wherein the calling means transmits at least one of a message and a display screen for prompting the communication terminal to be operated to the communication terminal held by the target person.

(Supplementary Note 12)
The notification system according to any one of Supplementary Notes 1 to 11, wherein the notification means sends the notification to a communication terminal that is associated with the communication terminal held by the target person in advance.

(Supplementary Note 13)
The notification system according to any one of Supplementary Notes 1 to 12, wherein the notification means sends the notification to the communication terminal held by the target person.

(Supplementary Note 14)
The notification system according to any one of Supplementary Notes 1 to 13, wherein the notification means sends the notification using e-mail.

(Supplementary Note 15)
The notification system according to any one of Supplementary Notes 1 to 13, wherein the notification means sends the notification using Short Message Service (SMS).

(Supplementary Note 16)
The notification system according to any one of Supplementary Notes 1 to 13, wherein the notification means sends the notification using a voice call.

(Supplementary Note 17)
A notification method performing the following processing:
  detecting an acoustic event from voice data transmitted from a communication terminal held by a target person; and
  sending a predetermined notification when the acoustic event has been detected.

(Supplementary Note 18)
A notification method performing the following processing:
  determining whether the content of an operation performed on a communication terminal held by a target person satisfies predetermined conditions; and
  sending a predetermined notification when it is determined that the content of the operation does not satisfy the predetermined conditions.

(Supplementary Note 19)
A program for causing the following procedures:
  detecting an acoustic event from voice data transmitted from a communication terminal held by a target person; and
  sending a predetermined notification when the acoustic event has been detected.

(Supplementary Note 20)
A program for causing a computer to execute the following procedures:
  determining whether the content of an operation performed on a communication terminal held by a target person satisfies predetermined conditions; and sending a predetermined notification when it is determined that the content of the operation does not satisfy the predetermined conditions.

This application is based upon and claims the benefit of priority from Japanese Patent Application No. 2017-203406, filed on Oct. 20, 2017, the disclosure of which is incorporated herein in its entirety by reference.

REFERENCE SIGNS LIST 100, 102 Notification system
101, 103 Management Server
110, 111 Detection Means
120, 121, 122, 123 Notification Means
131, 133 Calling Means
141 Update Means
151, 153 Database
162, 163 Determination Means
200, 201-1, 201-2, 202, 203-1, 203-2 Communication Terminal
301, 303 Communication Network

The invention claimed is:

1. A notification system comprising:
at least one memory storing instructions; and
at least one processor configured to execute instructions to:
make a call to a communication terminal;
transmit at least one of a message and a display screen for prompting the communication terminal to be operated to the communication terminal held by the target person;
determine whether a content of an operation performed on the communication terminal held by a target person satisfies predetermined conditions; and
send a predetermined notification depending on determining that the content of the operation does not satisfy the conditions.

2. The notification system according to claim 1,
wherein the at least one processor is further configured to execute instructions to:
send the notification depending on determining that the content of the operation does not satisfy the conditions continuously for a predetermined period.

3. The notification system according to claim 1,
wherein the at least one processor is further configured to execute instructions to:
determine whether the content of the operation performed on the communication terminal indicated by operation information transmitted from the communication terminal satisfies the predetermined conditions.

4. The notification system according to claim 1,
wherein the at least one processor is further configured to execute instructions to:
store the predetermined conditions in advance;
compare the content of the operation performed on the communication terminal with the conditions stored in a database; and
determine whether the predetermined conditions are satisfied.

5. The notification system according to claim 1,
wherein the at least one processor is further configured to execute instructions to:
send the notification that contain the content for suggesting actions to be taken to the communication terminal held by the target person to help the target person make a decision to go to a hospital.

6. The notification system according to claim 1,
wherein the at least one processor is further configured to execute instructions to send the notification that contain the content indicating that the condition of the target person seems to be different from the normal condition to the communication terminal that is associated with the communication terminal held by the target person in advance.

7. The notification system according to claim 1,
wherein the conditions are time from a timing when the call is made to the timing when the call is answered, time from the timing when the call is answered to the timing when the call is disconnected, or time from the timing when a question is made to the timing when the reply to the question is sent.

8. The notification system according to claim 1,
wherein the at least one processor is further configured to execute instructions to:
receive a first voice data from a first communication terminal of the target person after detecting an operation on the first communication terminal;
detect a difference regarding a physical condition of the target person depending on the first voice data and a basis, the basis being prepared for the target person;
send the notification to a second communication terminal depending on detection of the difference regarding the physical condition of the target person; and
update the basis by learning the first voice data from the first communication terminal by machine learning.

9. A notification method performing processing comprising:
making a call to a communication terminal;
transmitting at least one of a message and a display screen for prompting the communication terminal to be operated to the communication terminal held by the target person;
determining whether a content of an operation performed on the communication terminal held by a target person satisfies predetermined conditions; and
sending a predetermined notification depending on determining that the content of the operation does not satisfy the conditions.

10. A non-transitory computer readable medium storing a program for causing a computer to execute procedures comprising:
making a call to a communication terminal;
transmitting at least one of a message and a display screen for prompting the communication terminal to be operated to the communication terminal held by the target person;
determining whether a content of an operation performed on the communication terminal held by a target person satisfies predetermined conditions; and
sending a predetermined notification depending on determining that the content of the operation does not satisfy the conditions.

* * * * *